United States Patent Office.

JAMES RAMAGE AND THOMAS NELSON, OF EDINBURGH, SCOTLAND.

*Letters Patent No. 75,700, dated March 17, 1868; patented in England, March 26, 1866.*

IMPROVEMENT IN THE PRODUCTION OF PLATES FOR PRINTING.

The Schedule referred to in these Letters Patent and making part of the same.

TO ALL TO WHOM IT MAY CONCERN:

Be it known that we, JAMES RAMAGE and THOMAS NELSON, both of the city of Edinburgh, gentlemen, subjects of the Queen of Great Britain, have invented or discovered new and useful "Improvements in the Production of Blocks and Plates for Printing;" and we, the said JAMES RAMAGE and THOMAS NELSON, do hereby declare the nature of the said invention, and in what manner the same is to be performed, to be particularly described and ascertained in and by the following statement thereof; that is to say—

This invention has for its object improvements in the production of blocks and plates for printing.

A solution of bichromate of potash or ammonia, mixed with gelatine dissolved in water, is poured upon a sheet of suitable material, and, when dry, exposed under a negative of the drawing, engraving, or print, for a given time. It is then immersed in water till the parts not acted on by the light swell up to the desired extent. The surface water is then removed, and a solution of gutta percha, bitumen, and wax, or other such materials, is poured over the surface, forming a skin thereon. The back of this skin is then filled up to a proper thickness with melted wax or other materials, and when set, the mould thus produced is separated from the gelatine, and electrotyped, or a stereotype cast is taken.

For a copper or other plate, a transparency of the drawing, engraving, or print is used, the same processes gone through, and the plate produced is used for printing in the ordinary way, or, in the same way, the plate may be produced directly from the drawing, engraving, or print.

Having thus stated the nature of our said invention, we will proceed to describe the manner in which we prefer to perform the same.

A quantity of good gelatine is soaked in cold water until it is completely swelled, and the remaining water is drained off. The dish containing the gelatine is then plunged into boiling water, and so the gelatine is melted. To it there is then added, and dissolved in the gelatine, as much bichromate of potash or of ammonia as the gelatine will hold without crystallizing when poured on a strip of glass and dried. The solution is filtered, and, whilst still warm, it is employed to coat the surface on which it is to be employed. The surface we prefer is of tin-foil. The metal should be about as thick as stout paper, and quite smooth and flat.

The gelatine solution is poured evenly over the surface, to the thickness of, say, ordinary card-board, more or less, according to the amount of relief desired to be obtained, and the coating is thoroughly dried. These operations are conducted in the dark.

The coated plate is then exposed to light under a negative, by preference on glass, of the design corresponding with the printing-block desired to be obtained. It may be a photograph from an engraving, or drawing, or otherwise. The length of exposure will vary, as a photographer will understand, according to the quality of the negative, the thickness of the coating, and the intensity of the light. In bright sunshine, however, it will usually be from ten to fifteen minutes. The exposure being completed, the plate is immersed in cold water till the parts unaltered by the light swell up to the required height, and then the plate is removed from the water, and any water which remains on the surface is to be carefully removed with blotting-paper.

The next operation is to form a skin on the surface of the plate, by pouring over it a solution, in bisulphide of carbon, of one part of asphaltum, three parts of gutta percha, and one part of India rubber, which last is dissolved in as small a quantity of benzole as is necessary for the purpose, before adding it to the other ingredients. The quantity of bisulphide of carbon should be such as to reduce the solution to the consistence of ordinary photographic collodion, and the coating of solution is applied by pouring it over the prepared plate and running off the excess. It sets immediately into a tough, hard skin.

Next, the edges of the metal plate are turned up all round, so as to form a tray, which is then filled with a composition, consisting of six parts of bees-wax, four parts of paraffine, and two parts of asphaltum. These substances are melted by heat, and thoroughly mixed. Before the composition is used, it should be cooled as far as it can be without loss of fluidity. As soon as the composition is completely cold, the tin-foil is separated all round the edges, by bending it away from the block, and it is then readily removed, leaving a block with a perfect mould on its surface. This block we stereotype in the manner in which a form of type is usually stereotyped, and so we obtain a surface printing-block; or, with the same object, we sometimes electrotype the mould, as is also well understood, and so we obtain a printing-block or surface. Small blocks or stamps, to be used by hand, are conveniently produced in this manner.

For the production of engraved plates, for printing in the manner of copper-plate printing, the process is conducted in a similar manner, the only difference being that a positive of the design is employed in place of a negative.

We employ, by preference, a photographic positive on glass, or a print or copy of the design on paper may be used.

What we claim, is—

The combined process, herein described, for the production of blocks and plates for printing, such combined process consisting in acting on a film of gelatine rendered sensitive by a chromate salt, with light passed through a positive or negative of the design required, then wetting the gelatine surface, so as to cause it to swell in parts, then coating the swollen surface with an impervious skin, afterwards taking a cast from the surface so obtained, and lastly, stereotyping or electrotyping the mould so obtained, substantially as herein described.

JAMES RAMAGE,
THOS. NELSON.

Witnesses:
JOHN CHRISTIE DEANS, *of the City of Edinburgh, in Scotland, Writer.*
JAMES SIMPSON REIKIE, *of the City of Edinburgh, in Scotland, Writer.*